US008924707B2

(12) United States Patent
Majumdar et al.

(10) Patent No.: US 8,924,707 B2
(45) Date of Patent: Dec. 30, 2014

(54) COMMUNICATING CONFIDENTIAL INFORMATION BETWEEN AN APPLICATION AND A DATABASE

(75) Inventors: Shamik Majumdar, Karnataka (IN); Ankit Kumar Katiyar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

(21) Appl. No.: 12/730,276

(22) Filed: Mar. 24, 2010

(65) Prior Publication Data

US 2011/0238978 A1 Sep. 29, 2011

(30) Foreign Application Priority Data

Apr. 28, 2009 (IN) .............................. 974/CHE/2009

(51) Int. Cl.
*H04L 29/06* (2006.01)
(52) U.S. Cl.
CPC ............ *H04L 63/0428* (2013.01); *H04L 63/18* (2013.01)
USPC ........................................................ 713/152
(58) Field of Classification Search
None
See application file for complete search history.

(56) References Cited

U.S. PATENT DOCUMENTS

| | | | | |
|---|---|---|---|---|
| 7,016,875 | B1 * | 3/2006 | Steele et al. ..................... | 705/44 |
| 2002/0107807 | A1 * | 8/2002 | Ketonen et al. ................. | 705/51 |
| 2005/0060534 | A1 * | 3/2005 | Marvasti ........................ | 713/151 |
| 2005/0108521 | A1 * | 5/2005 | Silhavy et al. ................. | 713/156 |
| 2008/0065640 | A1 * | 3/2008 | Shulman et al. ................. | 707/9 |
| 2008/0163332 | A1 | 7/2008 | Hanson | |

FOREIGN PATENT DOCUMENTS

CN          1835507 A          9/2006

OTHER PUBLICATIONS

European Search Report mailed Sep. 13, 2012 for serial No. 10159409.4 filed Apr. 8, 2010.
IBM, "Encrypting JDBC Channel Through Infrastructure Aspect Weaving", IP.com Journal, May 31, 2006, whole document, IP.com Inc., West Henrietta, NY, US.
IDS Software: "IDS Server User's Guide", Jun. 1, 2005, pp. 6-7, p. 49 figure 7, p. 58 lines 1-6, p. 85 lines 1-7, p. 92 section 5.3.4, p. 97 section 5.6, p. 100 section 6.2.4 p. 102 section 6.4 http://www.idssoftware.com/.
CN Search Report for Corresponding Appl No. 201010171578.5, 2 pp, Sep. 4, 2013.

* cited by examiner

*Primary Examiner* — Benjamin Lanier
(74) *Attorney, Agent, or Firm* — Elkington and Fife LLP; Nicholas Ertl

(57) ABSTRACT

Disclosed is a system and method for communicating confidential information in a resource friendly manner between an application and a database using an application programming interface, API. The method establishes first and second socket connections between the application and the database in an API connection between the application and the database. The first socket connection is arranged to be secure and the second socket connection is arranged to be non-secure. Information is then communicated through the first or second socket connection based on whether the information is identified as being confidential information or not. The evaluation of confidentiality may be undertaken at the client side of a JDBC or ODBC layer without putting any extra pressure on the database server side.

18 Claims, 2 Drawing Sheets

COMMUNICATING CONFIDENTIAL INFORMATION BETWEEN AN APPLICATION AND A DATABASE

When communicating information, the security of confidential information or data is an important consideration. Secured socket layer (SSL) is an industry standard protocol for securing data communication across a communication link. SSL uses a key-based encryption algorithm to provide for authentication, confidentiality and data integrity. However, SSL connections impose higher computational and resource requirements than non-secure communications.

Java Database Connectivity (JDBC) is an Application Programming Interface (API) for the Java programming language that defines how a client application may access a database of information. Known JDBC drivers support SSL communication. A drawback associated with these JDBC drivers is that when they operate in the secure mode, all communications with the database occur through SSL, even if the information in the database is a mixture of confidential and non-confidential data. Hence, applications operating in secure mode suffer from reduced performance even when exchanging non-confidential data with the database.

Database vendors typically implement interfaces in a proprietary manner and provide a Java API which client applications are required to use in order to communicate with the database. For database vendors which support SSL communication over JDBC, there is generally provided a configuration file with which it is required to enable SSL for a secure connection to be established, for example, by setting a variable named "ssl" to the value "true" (i.e. "ssl=true") in the database configuration file "database.conf". After enabling SSL, all database communications will be via SSL, meaning they will be encrypted so as to be securely transmitted.

It has been proposed that, if an application requires dynamic security, one can arrange the application to perform the following steps: create one pool of JDBC connections over non-secure sockets; create another pool of JDBC connections over secure sockets; decides before each database communication, which JDBC pool to use in-order to communicate with database. This known method has serious drawbacks, because the application needs to be re-compiled when any security related requirements are modified. Furthermore, the application needs to maintain the connection pools and routing logic which can be error-prone.

BRIEF DESCRIPTION OF THE EMBODIMENTS

Figure 1:
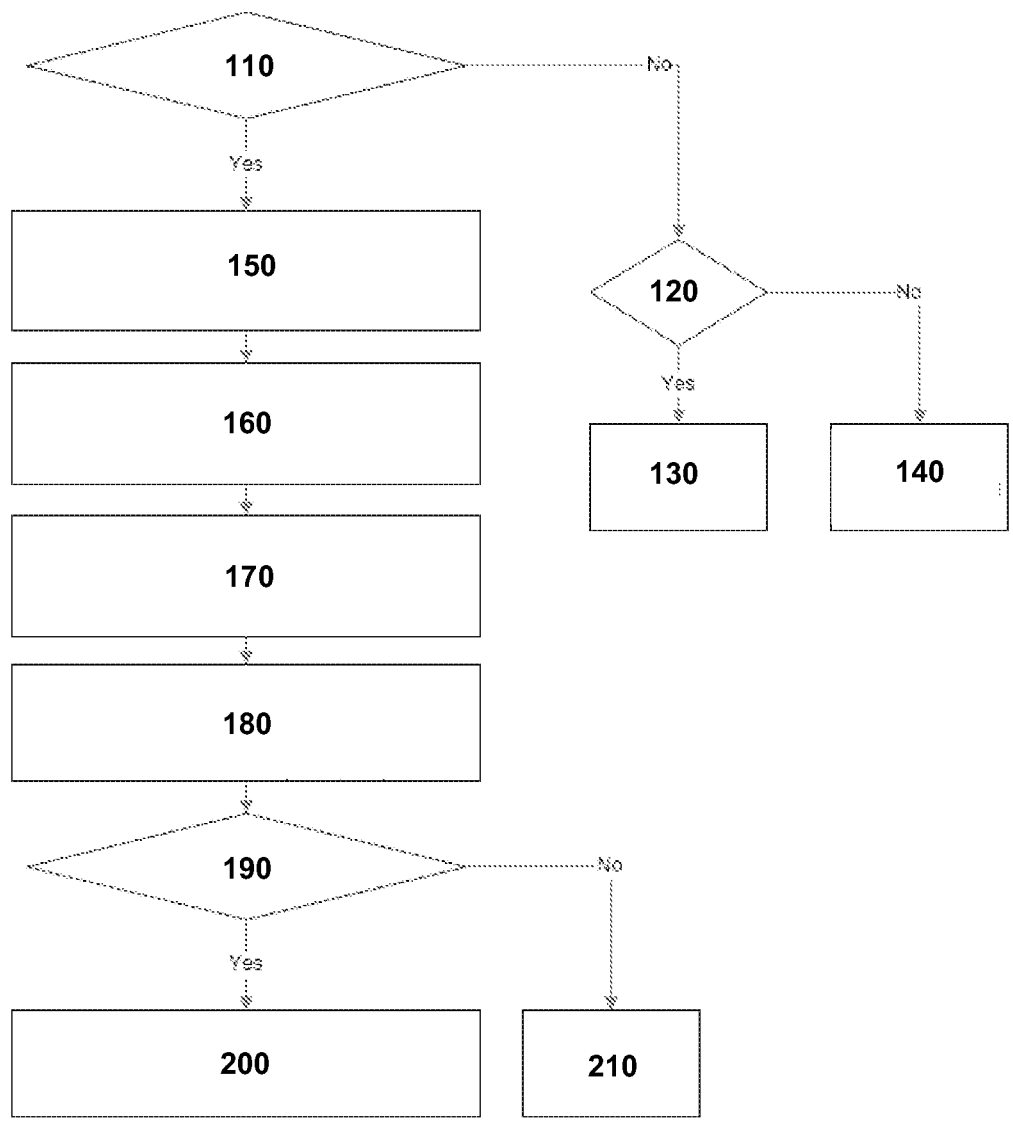
Figure 2:
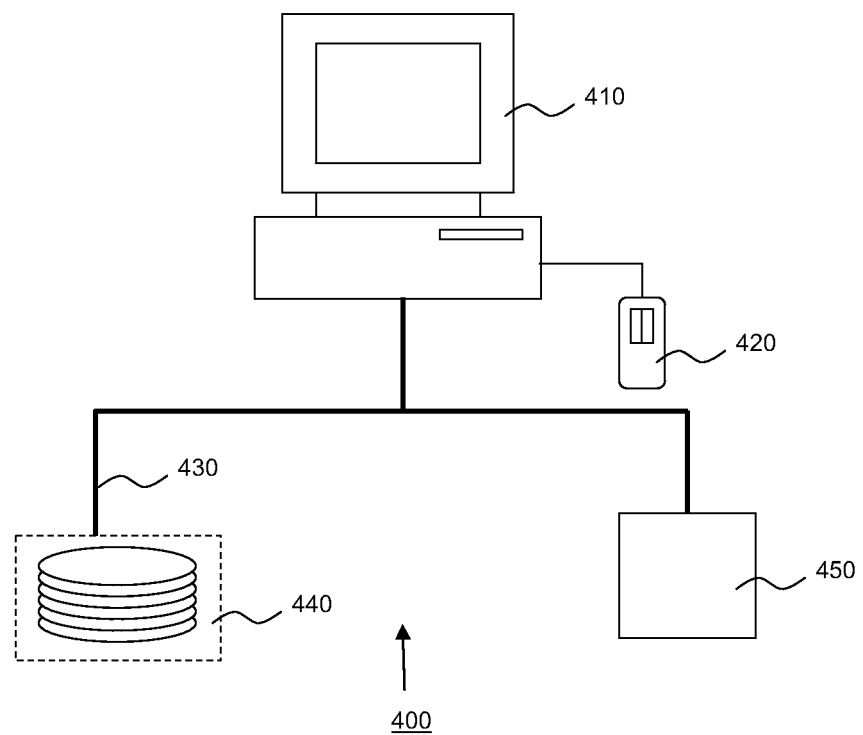

Embodiments of the invention are described in more detail and by way of non-limiting examples with reference to the accompanying drawings, wherein FIG. 1 is a flow diagram of a JDBC driver implemented method according to an embodiment; and FIG. 2 schematically depicts a data processing system according to an embodiment of the present invention.

DETAILED DESCRIPTION OF THE DRAWINGS

It should be understood that the Figures are merely schematic and are not drawn to scale. It should also be understood that the same reference numerals are used throughout the Figures to indicate the same or similar parts.

According to the invention, there is provided a method that can be adopted to achieve context-based network level security while communicating between an application and a database which caters for a mixture of confidential and non-confidential information. Embodiments may enable dynamic security without needing any code re-compilation for new or modified security requirements. Embodiments may also be easily integrated with legacy or conventional applications.

By employing an embodiment, applications may therefore gain security on a need only basis without using any application level logic.

Embodiments may use eXtensible Markup Language (XML) files to represent the security requirements of a database. The security requirements can be evaluated for every Structured Query Language (SQL) query issued by the application against a pre-defined requirement in an XML file and, accordingly, information may then be routed using either a secure or non-secure mode of communication. Further, the evaluation of confidentiality may be undertaken at the client side of a JDBC or ODBC layer without putting any extra pressure on the database server side.

Embodiments enable a user to define security requirements of a database. Security requirements or rules can be defined at the time of development by a developer using source code annotations, at the time of the deployment by a field engineer, or by an end user using XML files. These XML files are referred as Security Context Files (SCFs). While developing a database centric application, developers/architects can identify information, such as tables or columns of a table, which needs to be treated as confidential and can annotate JDBC queries so that a SSL layer is used if this confidential information is communicated. Similarly, an end user of the database centric application may define their own confidential data stores by using SCF files.

Embodiments present a new kind of JDBC driver which will evaluate source code annotations and SCF files to understand the security requirements of a particular database instance. The driver maintains two socket connections to the database for each connection at the JDBC layer. One socket connection is over SSL (in other words, secure) and another is a normal (non-secure) socket connection.

The driver parses each SQL query issued against the database and, if it is established that a query is against confidential information, it automatically routes the information packets through secured sockets and receives information from the database over these secured sockets. For queries which do not involve confidential information, the information flows through non-secure sockets. The logic is handled by the JDBC drivers and the application is unaware of a security model which is requirement or context sensitive.

By parsing queries at the client side, embodiments may enable different clients to have their own definition of a confidential data-store. For example, client A, which is outside an enterprise network, can mark one sales table T as containing confidential date, whereas client B, which is inside the enterprise network, might treat is as non-confidential information because it is connecting to the database via the intranet.

During deployment of the application, a user can create and/or modify security rules or requirements, thus enabling "dynamic security".

FIG. 1 is a flow diagram of a JDBC driver implemented method 100 according to an embodiment. "SSL_Dynamic" is a variable defined in the configuration file of the JDBC driver. The SSL_Dynamic variable is used to define whether or not dynamic security is to be implemented according to an embodiment.

In the first step, step 110, the JDBC driver determines whether or not the value of the SSL_Dynamic variable equals "dynamic" (i.e. whether or not dynamic security is to be implemented).

If the SSL variable does not equal "dynamic", the method proceeds to step 120 in which it is determined whether or not a SSL connection is required for communication of information by determining whether the boolean variable "SSL" in the database configuration file "database.conf" is "true" or "false"". If the value of "SSL" equals "true", the method proceeds to step 130 in which all database communications are securely made via a SSL connection. Otherwise, if the value of "SSL" equals "false", the method proceeds to step 140 in which all database communications are made via a normal, non-secure, socket connection.

Returning now to step 110, if the SSL_Dynamic variable is equal to "dynamic", the method proceeds to step 150 in which the JDBC driver checks for security annotations in source code of the application, and then proceeds to step 160 in which the JDBC driver checks for SCF files. Here the security requirements defined in the SCF file(s) supersedes those defined by the source code annotations, and so the SCF files are used to overwrite the source code annotations.

Next, in step 170, the JDBC driver establishes first and second socket connections with the database at the JDBC layer connection. The first socket connection is arranged to be secure, for example by using an SSL encryption protocol. The second socket connection is a normal non-secure socket connection that does not employ an encryption method to secure information transmitted through it.

The method then proceeds to step 180. In step 180, the JDBC driver parses SQL query statements that are passed to it using the statement interface. Proceeding to step 190, the JDBC determines whether or not the query is trying to access, update or insert confidential information. Based on the result of this determination, the JDBC communicates the information through either the first, secure socket connection or the second, non-secure socket connection. More specifically, if, in step 190, the query is determined to relate to confidential information, the JDBC driver communicates the required information via the secure socket connection (step 200). On the other hand, if, in step 190, the query is determined not to relate to confidential information, the JDBC driver communicates the required information via the non-secure socket connection (step 210).

It will be appreciated that, during designing and development of an application, developers can identify information stores, such as tables or columns, of the database that contain confidential information or data. While querying confidential information, developers can use annotations in the code to instruct the driver to send and receive data through SSL. For example, when developers are querying user id and password from a user table of the database, it needs to be secure by default. A sample client code with annotations may, for example, be as follows.

```
//Obtain naming context
Context initCtx = new InitialContext( );
Context envCtx = (Context) initCtx.lookup("java:comp/env");
//Look up data source by the name given to it when created "jdbc/myDB".
DataSource ds = (DataSource) envCtx.lookup("jdbc/myDB")
String sql="select id,passwd from user where id =? and passwd ?";
AuthenticateUser(ds,sql);
/**
* user table is marked as secure table.
* Any DML statement on this table will be routed through SSL.
/*
@SECURETABLE("user")
@SECURECOLUMN("*")
public boolean AuthenticateUser(DataSource dataSource)
{
Connection conn = null;
PreparedStatement st = null;
try {
```

```
    conn = dataSource.getConnection( );
    st = conn.prepareStatement("select id,passwd from user where
id =? and passwd = ?");
        st.setString(1,'Scott');
        st.setString(2,'Tiger');
        ResultSet rs = st.executeQuery( );
        if (rs.next( )) {
        //perform some validation
            return true;
        }
    } catch (SQLException se) {
        log.error(se, se);
        return false;
    } finally {
        rs.close( );
        st.close( );
        conn.close( );
    }
}
```

In the above exemplary source code snippet, the developer has marked all the columns of the table "user" as a confidential data store. Thus, as explained above, in the case where the variable "SSL_Dynamic" is set to "dynamic" in the configuration file of the JDBC driver, the JDBC driver will route the database communication through a secure socket if any query involves accessing/updating/inserting the table "user". Following this rule, the query fired in the method "AuthenticateUser" will have to go through a secured communication channel.

As mentioned above, another way to mention whether to use a secure socket communication or not is to use an XML-based Security Context File (SCF). In a SCF, one can specify the name of the database, table name, column name which needs to be treated as a confidential data store. If the value of the variable "SSL_Dynamic" is set to "dynamic" in the configuration file of the JDBC driver, the JDBC driver will parse each SQL query to find out any of the SQL is trying to work on confidential data stores (as explained in conjunction with in step 190 of FIG. 1). If it is determined that the query relates to a confidential data store, the JDBC driver will route the information traffic through a secure socket connection, using a SSL-based protocol for example.

An exemplary SCF file may be defined as follows.

```
<?xml version="1.0" encoding="UTF-8"?>
<confidential_data_store>
    <schema instance_name="myDB">
        <schema-elements>
            <schema-element name="user" type="table">
                <sub-element name="id" type="column"/>
                <sub-element name="passwd" type="column"/>
            <schema-element>
            <schema-element             name="add_user_p"
type="procedure"/>
                <schema-element name="user_views" type="view">
                <schema-element name="creditcard" type="table">
                    <sub-element name="*" type="column"/>
                </schema-element>
            </schema-element>
        </schema-elements>
    </schema>
</confidential_data_store>
```

According to this SCF file, any query trying to access user id or password from the table user of "myDB" database needs to be routed to secured sockets using SSL, since it is identified as containing confidential information.

FIG. 2 shows a data processing system 400 in accordance with an embodiment of the present invention. A computer 410 has a processor (not shown) and a control terminal 420 such as a mouse and/or a keyboard, and has access to a database stored on a collection 440 of one or more storage devices, e.g. hard-disks or other suitable storage devices, and has access to a further data storage device 450, e.g. a RAM or ROM memory, a hard-disk, and so on, which comprises the computer program product implementing a method according to an embodiment. The processor of the computer 410 is suitable to execute the computer program product implementing a database connectivity driver in accordance with an embodiment. The computer 410 may access the collection 440 of one or more storage devices and/or the further data storage device 450 in any suitable manner, e.g. through a network 430, which may be an intranet, the Internet, a peer-to-peer network or any other suitable network. In an embodiment, the further data storage device 450 is integrated in the computer 410.

It has been shown that embodiments can provide context-sensitive security in applications to provide improved performance and reduced hardware requirements. This is also in line with attribute oriented programming (AOP) concepts.

It will be appreciated that embodiments provide advantages which can be summarised as follows:

Performance can be improved by not using secure communication method (such as SSL) for the communication of non-confidential information.

No application level logic is needed to provide dynamic database connectivity over SSL.

Embodiments enable the design of a security module either at the development time or during the deployment time. This provides more power to the end user, who can modify the security requirements according to changing needs.

Embodiments may also be seamlessly integrated with existing applications that use JDBC to connect to a database.

Although embodiments have been described above with respect to the use of JDBC, it will be understood that embodiments can be implemented using other known Application Programming Interfaces (APIs), such as the Open Database Connectivity (ODBC) API.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for communicating confidential information between an application and a database using an application programming interface, API, the method comprising the steps of:
   establishing an API connection between the application and the database;
   establishing first and second socket connections between the application and the database in the API connection, wherein the first socket connection is arranged to be secure and the second socket connection is arranged to be non-secure;
   evaluating a security annotation in a source code of the application to determine a security requirement of information in the database;
   selecting the first secure socket connection or the second non-secure socket connection based on the evaluation of the security annotation in the source code of the application; and
   communicating the information between the database and the application through the selected socket connection.

2. The method of claim 1, further comprising:
   communicating the information through the first or second socket connection based on whether the information is identified as being confidential information, wherein the confidential information is identified in an extensible markup language.

3. The method of claim 1, wherein the API comprises a database connectivity, DBC, driver for establishing the API connection.

4. The method of claim 3, wherein the DBC driver is a java database connectivity, JBDC, driver or an open database connectivity, ODBC, driver.

5. The method of claim 1, wherein communicating the information further comprises:
   parsing a query directed to the database to evaluate a confidentiality of the information; and
   communicating the information through the first or second socket connection based on whether the information is identified as being confidential information or not.

6. The method of claim 1, wherein the secure socket connection uses a secured socket layer protocol.

7. The method of claim 1, further comprising: modifying the information identified as being confidential.

8. The method of claim 1, wherein communicating information is further based on security rules defining requirements for the communication of information.

9. A non-transitory computer readable storage medium on which is embedded a computer program that, when executed on a computer, is to:
   establish an application programming interface, API, connection between an application and a database;
   establish first and second socket connections between the application and the database in the API connection, wherein the first socket connection is secure and the second socket connection is non-secure;
   evaluate a security annotation in a source code of the application to determine a security requirement of information in the database;
   select the first secure socket connection or the second non-secure socket connection based on the evaluation of the security annotation in the source code of the application; and
   communicate the information between the database and the application through the selected socket connection.

10. The non-transitory computer readable storage medium of claim 9, wherein the computer program is further to:
    communicate the information through the first or second socket connection based on whether the information is identified as being confidential information, wherein the confidential information is identified in an extensible markup language.

11. The non-transitory computer readable storage medium of claim 9, wherein the API comprises a database connectivity, DBC, driver for establishing the API connection.

12. The non-transitory computer readable storage medium of claim 9, wherein the secure socket connection uses a secured socket layer protocol.

13. The non-transitory computer readable storage medium of claim 9, wherein the computer program is further to modify the information identified as being confidential.

14. The non-transitory computer-readable storage medium of claim 9, wherein the computer program is further to:
   parse a query of information directed to the database to evaluate a confidentiality of the information; and
   communicate the information through the first or second socket connection based on whether the information is identified as being confidential information or not.

15. A data processing system comprising:
   a data storage to store information;
   a computer program memory on which is embedded a computer program to:
      establish an application programming interface, API, connection between an application and the data storage;
      establish first and second socket connections between the application and the data storage in the API connection, wherein the first socket connection is secure and the second socket connection is non-secure;
      evaluate a security annotation in a source code of the application to determine a security requirement of information in the data storage;
      select the first secure socket connection or the second non-secure socket connection based on the evaluation of the security annotation in the source code of the application; and
      communicate the information between the database and the application through the selected socket connection; and
   a data processor having access to the computer program memory and the data storage, wherein the data processor is to execute said computer program.

16. The data processing system of claim 15, wherein the computer program is further to:
   communicate the information through the first or second socket connection based on whether the information is identified as being confidential information, wherein the confidential information is identified in an extensible markup language.

17. The data processing system of claim 15, wherein the API comprises a database connectivity driver for establishing the API connection.

18. The data processing system of claim 15, wherein the computer program is further to modify the information identified as being confidential.

* * * * *

UNITED STATES PATENT AND TRADEMARK OFFICE
CERTIFICATE OF CORRECTION

| | | |
|---|---|---|
| PATENT NO. | : 8,924,707 B2 | Page 1 of 1 |
| APPLICATION NO. | : 12/730276 | |
| DATED | : December 30, 2014 | |
| INVENTOR(S) | : Shamik Majumdar et al. | |

It is certified that error appears in the above-identified patent and that said Letters Patent is hereby corrected as shown below:

In the claims

In column 6, line 21, in Claim 4, delete "JBDC" and insert -- JDBC --, therefor.

In column 7, line 4, in Claim 14, delete "computer-readable" and insert -- computer readable --, therefor.

Signed and Sealed this
Sixth Day of October, 2015

Michelle K. Lee
*Director of the United States Patent and Trademark Office*